(12) United States Patent
Meckler et al.

(10) Patent No.: US 12,491,494 B2
(45) Date of Patent: Dec. 9, 2025

(54) MOISTURE SWING $CO_2$ SORBENTS WITH ENHANCED CAPACITY AND KINETICS

(71) Applicant: PALO ALTO RESEARCH CENTER INCORPORATED, Palo Alto, CA (US)

(72) Inventors: Stephen Meckler, Campbell, CA (US); Mahati Chintapalli, Mountain View, CA (US)

(73) Assignee: GENESEE VALLEY INNOVATIONS, LLC, Santa Clara, CA (US)

(*) Notice: Subject to any disclaimer, the term of this patent is extended or adjusted under 35 U.S.C. 154(b) by 891 days.

(21) Appl. No.: 17/688,508

(22) Filed: Mar. 7, 2022

(65) Prior Publication Data
US 2022/0323934 A1 Oct. 13, 2022

Related U.S. Application Data

(60) Provisional application No. 63/170,008, filed on Apr. 2, 2021.

(51) Int. Cl.
*B01J 20/26* (2006.01)
*B01J 13/00* (2006.01)
*B01J 20/28* (2006.01)
*C08J 3/24* (2006.01)

(52) U.S. Cl.
CPC ......... *B01J 20/267* (2013.01); *B01J 13/0091* (2013.01); *B01J 20/28047* (2013.01);
(Continued)

(58) Field of Classification Search
CPC .................. B01J 20/267; B01J 13/0091; B01J 20/28047; B01J 20/28083; B01J 2220/50;
(Continued)

(56) References Cited

U.S. PATENT DOCUMENTS 6,646,083 B2  11/2003  Hirano et al.
9,527,747 B2  12/2016  Wright et al.
(Continued)

FOREIGN PATENT DOCUMENTS

CN  1254511 C  5/2006
CN  110354827 A  * 10/2019

OTHER PUBLICATIONS

Molecular Sieve Desiccants (The Impact of Pore Size in High Quality Molecular Sieve Adsorbents on Performance, 2023) (Year: 2023).*

(Continued)

*Primary Examiner* — Michael Forrest
*Assistant Examiner* — Logan Edward Laclair
(74) *Attorney, Agent, or Firm* — Miller Nash LLP

(57) ABSTRACT

A composition of matter having a porous cross-linked polymer network, quaternary ammonium ions in the cross-linked polymer network, and at least one counter ion in the cross-linked polymer network that is at least one of hydroxide or a counter ion capable of forming hydroxide upon reaction with water. A method to produce a porous material includes polymerizing a compound containing quaternary ammonium and a cross-linker using controlled polymerization and ion exchange in the presence of at least one of hydroxide or a counter ion capable of forming hydroxide upon reaction with water. A method to capture $CO_2$, includes employing a sorbent comprising a quaternary ammonium ions in a porous cross-linked polymer network in an environment to adsorb $CO_2$.

19 Claims, 4 Drawing Sheets

(52) U.S. Cl.
CPC ........... *B01J 20/28083* (2013.01); *C08J 3/24* (2013.01); *B01J 2220/50* (2013.01)

(58) Field of Classification Search
CPC .............. B01J 20/28042; B01J 20/3425; B01J 20/28057; B01J 20/3085; B01J 20/3483; C08J 3/24; Y02C 20/40; B01D 53/02; B01D 53/261; B01D 53/28; B01D 2257/504; B01D 2257/80; B01D 2258/06; B01D 53/0454

See application file for complete search history.

(56) References Cited

U.S. PATENT DOCUMENTS

| | | | |
|---|---|---|---|
| 10,626,224 | B2 | 4/2020 | Chintapalli et al. |
| 10,836,855 | B2 | 11/2020 | Chintapalli et al. |
| 2018/0093456 | A1 | 4/2018 | Van Overmeere et al. |
| 2020/0031977 | A1 | 1/2020 | Chintapalli et al. |
| 2020/0345882 | A1* | 11/2020 | Kim .......................... C08L 5/04 |
| 2021/0370226 | A1 | 12/2021 | Meckler et al. |

OTHER PUBLICATIONS

Tran et al. (Hydrogel applications for adsorption of contaminants in water and wastewater treatment, Environmental Science and Pollution Research, 2018) (Year: 2018).*

Machine translation of CN-110354827-A (Year: 2019).*

Couture et al., "Polymeric materials as anion-exchange membranes for alkaline fuel cells," J. Progress in Polymer Science, 2011, pp. 1521-1557.

He et al., "Porous polymers prepared via high internal phase emulsion polymerization for reversible $CO_2$ capture," Polymer 55, 2014, pp. 385-394.

* cited by examiner

MOISTURE SWING $CO_2$ SORBENTS WITH ENHANCED CAPACITY AND KINETICS

CROSS REFERENCE TO RELATED APPLICATION

This application claims priority to and the benefit of U.S. Provisional Application No. 63/170,008 filed Apr. 2, 2021, which is incorporated herein by reference in its entirety.

TECHNICAL FIELD

This disclosure relates to moisture swing sorbents, more particularly to moisture swing sorbents having high surface area and improved pore characteristics.

BACKGROUND

Existing direct air carbon dioxide ($CO_2$) capture processes have limited adoption due to high cost, in the range of $100-1000 per ton of $CO_2$, and high energy consumption of 170-570 kJ/mol $CO_2$. This corresponds to second law efficiencies, a comparison of a system's actual energy of capture to the minimum possible energy of capture, in the range of 4-12 percent. One type of direct air capture involves the use of temperature swing adsorption (TSA) processes, typically using liquid or solid chemi- or physisorbents.

These processes have several fundamental restrictions that limit the second law efficiencies and process cost for $CO_2$ capture at dilute ambient concentrations. The high heat of adsorption needed for selective $CO_2$ uptake at 400 ppm, greater than 60 kJ/mol $CO_2$, necessitates large temperature swings. Parasitic sensible heat loads make the large temperature swings inefficient. Additional limitations arise because of competitive adsorption between $CO_2$ and water. Neutral amine sorbents also suffer from oxidative degradation.

Moisture swing adsorption represents one approach for direct air capture (DAC) that overcomes the limitations of TSA. MSA typically employs solid sorbents with quaternary ammonium (qAm). Quaternary ammonium can also be referred to as quaternary amine. Compared to TSA sorbents with unhindered amines, MSA sorbents operate at lower temperatures, and MSA qAm sorbents have longer lifetimes and better oxidation resistance. However, commercial MSA sorbents suffer from small specific surface area less than 1 $m^2/g$ that causes slow mass transfer kinetics. These sorbents have qAm groups buried far from the polymer-air interface, resulting in low capacity utilization. MSA sorbents with improved pore characteristics may show faster cycle time and higher accessible capacity, but no approach can synthesize these at a massive scale.

SUMMARY

According to aspects illustrated here, there is provided a composition of matter having a porous cross-linked polymer network, quaternary ammonium ions in the cross-linked polymer network, and at least one counter ion in the cross-linked polymer network that is at least one of hydroxide or a counter ion capable of forming hydroxide upon reaction with water.

According to aspects illustrated here, there is provided a method to produce a porous material includes polymerizing a compound containing quaternary ammonium and a cross-linker using controlled polymerization and ion exchange in the presence of at least one of hydroxide or a counter ion capable of forming hydroxide upon reaction with water.

According to aspects illustrated here, there is provided a method to capture $CO_2$, includes employing a sorbent comprising a quaternary ammonium ions in a porous cross-linked polymer network in an environment to adsorb $CO_2$.

DETAILED DESCRIPTION OF THE EMBODIMENTS

The embodiments here have disruptive performance over state-of-the-art moisture swing adsorption (MSA) sorbents due to key enabling technology advancements in lifetime $CO_2$ capture capacity. Lifetime $CO_2$ capture capacity is a composite of capacity, cycle rate and lifetime that drives MSA system performance. The structure of the MSA sorbents of the embodiments inherently reduces mass transfer barriers due to the massive increase in surface area. The mesopore sizes allow rapid gas transport. The MSA sorbents of the embodiments have better degradation resistance than other qAm (quaternary ammonium) sorbents produced by post-synthetic modification. The embodiments have the qAm groups covalently integrated into a polymer backbone.

The novelty of the embodiments comes from the controlled polymerization synthesis methods employed. Controlled polymerization of aerogels allows for structural characteristics optimal for carbon capture, including high surface area, small pore walls, and mesoporosity. Additionally, the arrangement of different monomer residues in the polymer gel can be deliberately designed, allowing for the active qAm groups to be placed together in blocks; as two qAm groups need to be in close proximity to desorb $CO_2$, this arrangement improves capacity. The spacing of qAm groups can also be modulated by pre-polymerizing segments of qAm with co-monomers or crosslinkers in a selected ratio, to achieve blocks with controlled average spacing of qAm groups. This arrangement also improves capacity, particularly under different ambient sorption and desorption conditions.

The embodiments cover a novel aerogel sorbent produced using PARC aerogel synthesis technology, the method of making the aerogel sorbents, and carbon capture modules/ systems utilizing the aerogel sorbents. One embodiment is a method to capture $CO_2$, comprising employing a sorbent comprising a quaternary ammonium ions in a porous cross-linked polymer network in an environment to adsorb $CO_2$. The adsorption may occur in one of ambient conditions or with active water or water vapor removal. The embodiments may include desorbing $CO_2$ from the sorbent, wherein desorption occurs through one of addition of water vapor, addition of fog, addition of mist, or addition of liquid water. Further, desorption may occurs at a higher, actively controlled temperature than adsorption. The sorbent used in the process may be further specified by the description of materials in this application.

Figure 1:
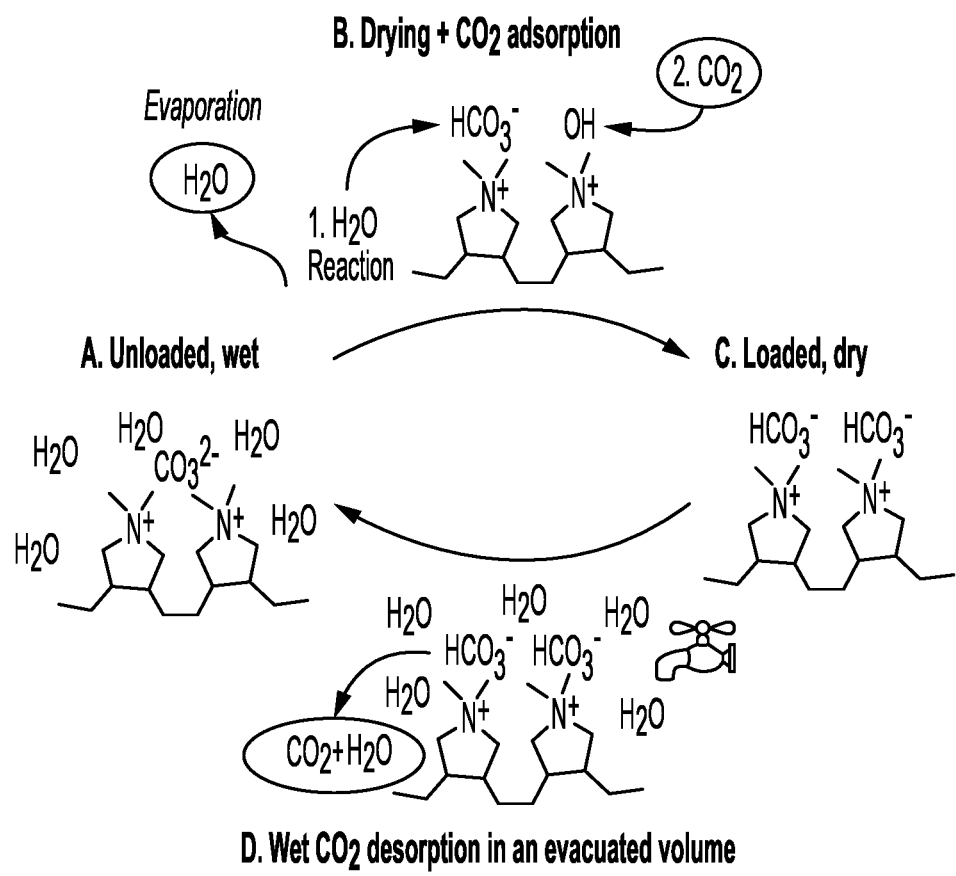
FIG. 1 shows a diagram of a moisture swing adsorption process.

FIG. 1 shows a diagram of a general MSA process. At A, the process starts with an unloaded, wet sorbent. As the sorbent dries, and $H_2O$ evaporates, the sorbent adsorbs $CO_2$ at B, which is stabilized as bicarbonate. Once the sorbent dries and becomes loaded at C, the process generally transfers the sorbent to an evacuated volume. The sorbent then gets wet and the $CO_2$ desorbs from the sorbent at D.

For more detail, in MSA processes using qAm groups, carbonate ions ($CO_3^{2-}$) bound to two qAm groups is stabilized by adsorbed water. $CO_2$ adsorption occurs as the sorbent spontaneously dries in ambient conditions such as in ~20-50% relative humidity (RH) at or around 20° C. Other temperature may range, for example temperatures 0-20° C., 0-80° C., 0-70° C., 0-40° C., 15-40° C., 15-30° C., or any subset or combination of those ranges, and pressures in the ranges of 0.04 kPa $CO_2$, 0.5 kPa $H_2O$, and 100 kPa air. The process can be conducted at ambient temperature or at an actively controlled temperature. The process can be conducted at ambient humidity or at an actively controlled humidity. Drying causes destabilization of the carbonate in the reaction $CO_3^{2-}+H_2O_{(ads)} \rightarrow HCO_3^- + OH^-$, and adsorption of $CO_2$ in the reaction $OH^- + CO_{2\,(g)} \rightarrow HCO_3^-$.

Upon drying, there is a net decrease in adsorbed water, as the hydration shells of $HCO_3^-$ are smaller than those of $CO_3^{2-}$. For desorption, the sorbent is closed in rough vacuum to separate air. Desorption occurs with water or humidity, such as in environments of greater than 60% relative humidity, greater than 70%, greater than 80%, greater than 90%, or greater than 95% RH, at or around 20° C., or at elevated temperatures. Temperature ranges may include, for example, 0-20° C., 0-120° C., 15-120° C., 20-100° C., 20-70° C., 0-80° C., 0-70° C., 0-60° C., 0-50° C., 0-40° C., 15-40° C., 15-30° C., or any subset of those ranges, restoring stability of $CO_3^{2-}$. The process can be conducted at ambient temperature or at an actively controlled temperature. The process can be conducted at ambient humidity or at an actively controlled humidity. In a single stage process, water and $CO_2$ are collected for compression, at 8-10 kPa $CO_2$, 30 kPa $H_2O$, and 1 kPa air, resulting in $CO_2$ at a higher concentration than in the input air or gas, for example approximately 90% $CO_2$ purity, after water is removed. The cycle is driven by the absolute water vapor pressure rather than relative humidity. The process may employ multiple stages to generate $CO_2$ at higher purity.

The embodiments involve the polymerization of a qAm-containing compound, such as 2-(Methacryloyloxy)ethyl] trimethylammonium, 2-(Acryloyloxy)ethyl]trimethylammonium, 3-(Methacryloylamino)propyl]trimethylammonium, (3-Acrylamidopropyl)trimethylammonium, diallyldimethylammonium (DADMA), vinylbenzyltrimethylammonium, or other trimethyl-ammonium functional monomers, and a porosity-stabilizing cross-linker, such as divinylbenzene (DVB), trimethylolpropane triacrylate, trimethylolpropane ethoxylate triacrylate, di(trimethylolpropane) tetraacrylate, dipentaerythritol penta-/hexa-acrylate, trimethacryl adamantane, dipentaerythritol, trimethylolpropane trimethacrylate, divinylbenzene, phenylene dimethacrylate, phenylene diacrylate, and 1,6-hexanediol diacrylate, or perfluorohexanediol. In some embodiments, the cross-linker is hydrophobic. Such cross-linkers include molecules with fluorinated or aliphatic groups.

In some embodiments, co-monomers are used. In some embodiments, crosslinkers contain qAm groups. In some embodiments, co-monomers or crosslinkers are selected for their hydrophobicity or hydrophilicity to control interaction strength with water. Residues of these may appear in the cross-linked polymer network, and may include styrene, styrenic compounds, n-vinyl pyrrolidone, vinyl acetate, vinyl chloride, methacrylates, acrylates, methyl methacrylate, acrylonitrile, methyl acrylate, ethylene, propylene, dimethylsiloxane, fluorinated vinyl, acrylic, or methacrylic compounds, hexa-iso-fluoroisopropyl methacrylate, hexa-iso-fluoroisopropyl acrylate, 2,2,2-trifluoroethyl methacrylate, 2,2,2-trifluoroethyl acrylate, and 1H,1H,2H,2H-Heptadecafluorodecyl methacrylate. In addition, the residue of the additional monomer may comprises a hydrophobic monomer that contains at least one of fluorinated or aliphatic groups.

In some cases, monomer can refer to any polymerizable species, including crosslinkers. In some embodiments, the mass fraction of the qAm-containing compound in the sorbent is between 5% and 90%, between 20% and 70%, between 50% and 70%, or between 50% and 90%. In some embodiments, the loading of qAm groups in the sorbent is between 0.1 and 6 mmol qAm/g sorbent, between 3 and 5 mmol qAm/g sorbent, or between 4 and 6 mmol qAm/g sorbent. In one embodiment, at least 80 percent of the quaternary ammonium ions are linked directly to at least one other quaternary ammonium ion.

The cyclic adsorption capacity is the difference in $CO_2$ uptake between an adsorbed state, at 25° C., 1 bar atmospheric pressure, 400 ppm $CO_2$, and a desorbed state, such as submersed in liquid water at 25° C. In some embodiments, the cyclic adsorption capacity is greater than 0.05 mmol/g, 0.1 mmol/g, 0.25 mmol/g, 0.5 mmol/g, 0.7 mmol/g, 1 mmol/g, 1.2 mmol/g or 1.5 mmol/g.

In order to maximize gravimetric capacity, the content of qAm-containing monomer may be maximized in the sorbent. Additionally, qAm monomers with low molecular weight may be selected, such as DADMA-Cl or 2-(Acryloyloxy) ethyl]trimethylammonium chloride, to minimize the content of atoms not involved in $CO_2$ sorption. In some embodiments, in the chloride ion-exchanged form, the molecular weight of the quaternary-amine bearing monomer giving rise to the quaternary amine functional groups in the polymer may be below 250 g/mol, 200 g/mol, 190 g/mol, 180 g/mol, or 170 g/mol.

Figure 2:
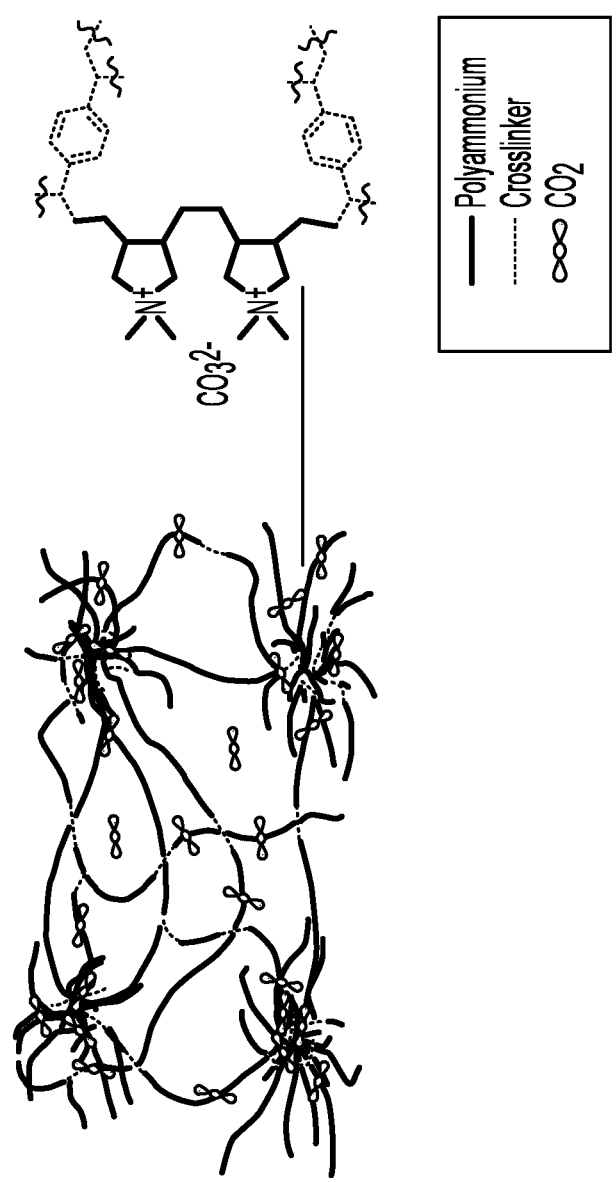
FIG. 2 shows a graphical representation of an MSA aerogel.

The sorbent of the embodiments will have unparalleled MSA performance due to the sorbent physical and chemical structure resulting from PARC's patented porous polymer stable free radical polymerization (SFRP), described in several patents and published patent applications such as U.S. Pat. No. 10,626,224, and US Patent Publication No. 2020/0031977. An example of an aerogel is shown in FIG. 2, comprising a porous cross-linked polymer network with quaternary ammonium ions and at least one counter ion.

In a general SFRP gelation process, precursors are dissolved in a solvent to form a precursor solution, with a stable free radical, optional reducing agents, and initiators. The precursor solution may include the quaternary ammonium-containing monomer, crosslinkers, and optional other monomers in a solvent with initiators, a nitroxide mediator, and optional reducing agents. The stable free radical in the form of a nitroxide mediator reversibly binds to a growing chain end, producing a 'dormant' chain. Chain growth only occurs in moments when the nitroxide, such as TEMPO-OH ($C_8H_{17}N_2O_2$), nitroxide species derived from the decomposition of an alkoxyamine, 4-hydroxy-TEMPO, TEMPO derivatives, TIPNO, TIPNO derivatives, chlorobenzyl-TIPNO, SG1, or SG1 derivatives, SG1 is also known as 3-nitro-4-(2-oxopyrrolidin-1-yl)benzenesulfonamide, decouples from the chain end. The reaction proceeds as a living polymerization with lowered probability of undesirable chain termination events and suppression of nanogel precipitates formed from back-biting reactions. To produce an aerogel, SFRP is carried out in a pore-templating solvent at 100-125° C. or 70-200° C. for 6-48 hours, or greater than 1 hour. The solvated gel is then solvent exchanged and ambiently dried.

While one embodiment uses SFRP, some embodiments use other types of controlled polymerization, including but not limited to atom-transfer radical polymerization (ATRP), nitroxide-mediated polymerization (NMP), and reversible addition-fragmentation chain-transfer (RAFT) polymerization. The resulting cross-linked polymer network from the controlled radical polymerization may include residual chemical moieties from the polymerization. These may include nitroxides, chain transfer agents, thiols, TEMPO-OH, nitroxide species derived from the decomposition of an alkoxyamine, 4-hydroxy-TEMPO, TEMPO derivatives, TIPNO, TIPNO derivatives, chlorobenzyl-TIPNO, SG1, SG1, thiocarbonylthio compounds, xanthates, trithiocarbonates, dithioesters, dithiocarbamates, dithiobenzoates, metal catalysts used in ATRP, copper, and iron.

In PARC's patented version of the SFRP process, additional reagents adjust the SFRP equilibrium to a more active state, producing nanogels of tunable size. This is accomplished by using slowly decomposing initiators, such as dicumyl peroxide or tertbutyl peroxide, to generate radicals continuously and reducing agents such as acetol to gradually consume excess free nitroxide. To ensure the proximity of qAm groups, a requirement for desorption that increases sorbent capacity, some embodiments of the SFRP synthesis begin with the controlled polymerization of DADMA or vinylbenzyltrimethylammonium oligomers, sometimes in the range of 2 to 10 units long. Critically, SFRP allows polymerization to be suspended and restarted with changes in temperature. Thus, subsequent reaction with crosslinker in the organic phase will incorporate poly(qAm monomer) into a space-filling crosslinked polymer gel. The arrangement of qAm residues in short blocks ensures that, even in a highly rigid, porous sorbent, pairs of qAm will be able to bind a $CO_3^{2-}$ anion.

In other cases, a similar technique could be deployed to incorporate the qAm groups in the polymer with an average distribution, for example by first polymerizing qAm with a desired concentration of a different non-qAm monomer or crosslinker, and then suspending and restarting the polymerization.

In some embodiments sorbent capacity is enhanced by having qAm groups distributed in a polymer chain non-adjacently, with a specified random frequency. The suspension of polymerization afforded by the SFRP and other controlled polymerization processes can allow blocky architectures where blocks are pure polymerized qAm monomer or statistical mixtures of polymerized qAm monomer and other monomers or crosslinkers.

Figure 3:
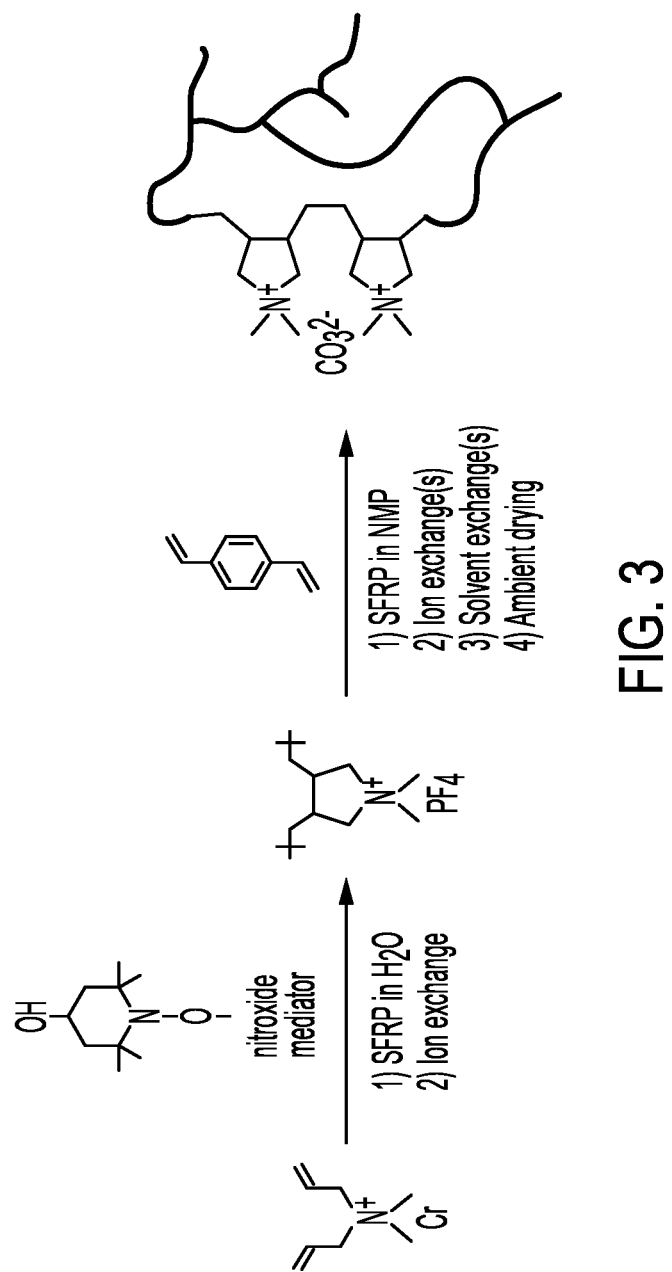
FIG. 3 shows a flowchart of a stable free radical polymerization process.

In an example sequential synthesis, shown in FIG. 3, water-soluble qAm monomer in Cl form (e.g. Vinylbenzyltrimethylammonium chloride or DADMA-Cl; qAm-Cl) will be polymerized in a water or water-alcohol mixture that can dissolve both the monomer and the nitroxide mediator, as previously shown with the SFRP of other anionic monomers, and the polymerization will be thermally suspended. In FIG. 2, the solid lines represents the polyammonium and dashed line represents the crosslinker. As shown in the figure, $CO_2$, binds to the polyammonium.

To achieve copolymerization of hydrophilic qAm monomers and hydrophobic crosslinkers such as DVB, some embodiments include an ion exchange of DADMA-Cl oligomers to anions less hydrophilic than Cl⁻ and transfer to an organic solvent, such as n-methylpyrrolidone, NMP, dimethylsulfoxide, acetophenone, dimethylformamide, xylenes, to allow further SFRP with DVB to form a gel. The solvent is selected to have a boiling point higher than the reaction temperature. A final ion exchange to an anion present in the MSA process, such as hydroxyl or carbonate ions, including $OH^-$, $HCO_3^-$, or $CO_3^{2-}$, followed by solvent exchange and ambient drying yields the sorbent aerogel, which can be used as a monolith or processed into a powder, or structured sorbent with or without a binder or substrate. The hydroxyl or carbonate ions remain resident in the sorbent aerogel.

Figure 4:
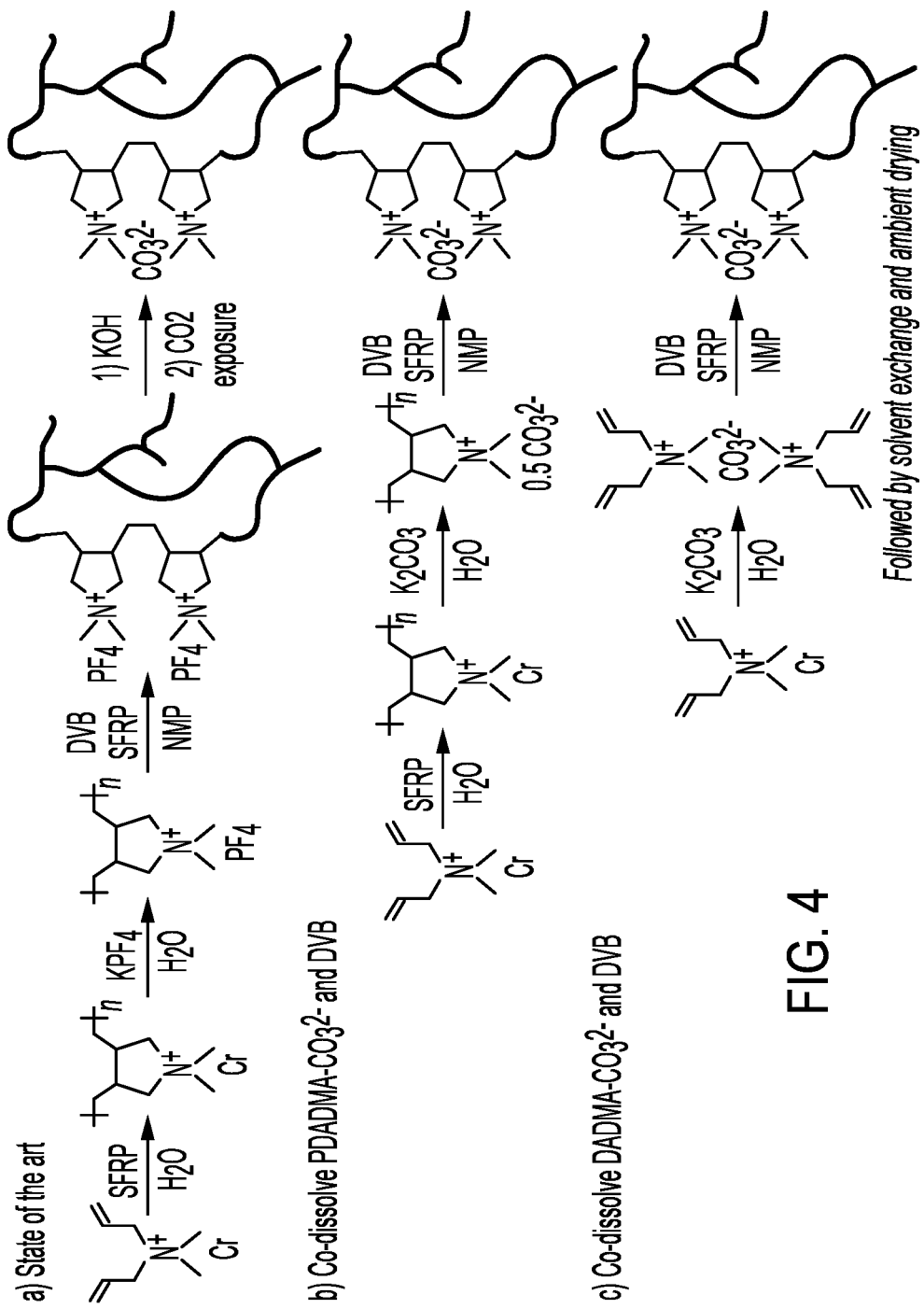
FIG. 4 shows a flowchart of variations of a process to form an MSA aerogel.

Several alternative routes to the polymer aerogel are outlined in FIG. 4. Potential routes to the product could also involve directly ion-exchanging the qAm-Cl monomer to anion involved in the MSA process and then co-polymerizing with a crosslinker, or polymerizing qAm-Cl, arresting polymerization, ion-exchanging to an anion involved in the MSA process, and then re-starting polymerization with co-monomers or crosslinkers. The procedures and variations described herein would also apply to a variety of qAm-functional monomers, and qAm functional monomers with vinyl groups or terminal carbon-carbon double bonds.

An additional benefit of PARC's SFRP is that it results in robust aerogels composed of rough, interconnected, gas-permeable nanogel particles with better properties for MSA applications compared to conventional SFRP polymers, where suppression of nanogels leads to pore collapse, or radical polymers, where larger, denser nanogels decrease surface area. In MSA sorbents, PARC's SFRP will provide the greatest boost to cycle rate by minimizing transport barriers; the pore wall size, which derives from nanogel size, is thinner, and the specific surface area is higher at equivalent porosity. Some embodiments exhibit high specific surface areas, such as greater than 100 $m^2/g$, mesopores 10-30 nm in diameter, and thin pore walls (~10 nm), enabling rapid rates of gas transport, bulk diffusion, and $CO_2$ uptake. The synthesis uses scalable processing without expensive supercritical $CO_2$, lowering cost and enhancing scalability.

Direct air capture of $CO_2$ with the aerogel sorbents can be integrated into a capture system or process. In some embodiments, water vapor is used to drive desorption, while in others liquid water is used in a spray process or by submerging the aerogel sorbent. Sometimes, heat, reduced pressures, or both are used to further drive desorption. In some embodiments, adsorption occurs in ambient conditions. In others, the water is actively removed from the aerogel, for example using heat, a fan, or a dehumidifier or air conditioning unit. In some embodiments, multiple desorption chambers are arranged in series. This arrangement can increase the pressure of desorbed $CO_2$. The aerogel itself can be a powder or structured monolith, and it may be self-supporting or held in shape by a separate structural material.

The embodiments here involve a sorbent for adsorption of carbon dioxide comprising quaternary ammonium ions in a porous cross-linked polymer network. The sorbent adsorbs more carbon dioxide in water vapor content than high water vapor content, or liquid water. The sorbent may have quaternary ammonium groups grouped together. The quaternary ammonium may be diallyldimethylammonium or trimethylammonium ion with a hydroxide, carbonate, bicarbonate, phosphate, hydrogen phosphate, or dihydrogen phosphate counter ion. Any counter ion that is either hydroxide or can react with water to form hydroxide will function. The cross-linked polymer network of the sorbent may comprise a powder or a monolith, and may comprises an aerogel.

The sorbent may include a crosslinker that is divinylbenzene, 1,6-hexanediol diacrylate, groups including methyl, ethyl propyl, isopropyl, tri, tetra, penta or hexa-acrylates and methacrylates, trimethylolpropane triacrylate, trimethylolpropane ethoxylate triacrylate, di(trimethylolpropane) tetraacrylate, dipentaerythritol penta-/hexa-acrylate, trimethacryl adamantane, dipentaerithritol, trimethylolpropane trimethacrylate, phenylene dimethacrylate, phenylene diacrylate, and perfluorohexanediol diacrylate. Additionally, the cross-linker may be hydrophobic and may contain at least one of fluorinated or aliphatic groups. The sorbent may have surface area that is greater than 100 $m^2/g$, greater than 200 $m^2/g$, greater than 500 $m^2/g$, and an average pore diameter between 2 and 50 nm.

The embodiments may include a method of making the sorbent using controlled polymerization, such as SFRP (stable free radical polymerization), RAFT (reversible addition fragmentation chain transfer), ATRP (atom transfer radical polymerization) or NMP (nitroxide mediated radical polymerization; also known as SFRP), or sequential polymerization. When the polymerization is SFRP, additional additive may also be used, such as a reducing agent, or a radical with a high decomposition temperature. Initiators may include thermal initiators, photoinitiators, peroxides, benzoyl peroxide, diacetylperoxide, di t-butylperoxide, lauroyl peroxide, dicumyl peroxide, azo compounds, Azobisisobutyronitrile (AIBN), phenylazotriphenylmethane, benzophenone, anthaquinone, camphorquinone, benzyl, and benzoin. Examples of reducing agents are reducing sugars such as glucose, reagents containing hemiacetal groups, hydroxyacetone, or enediol species derived from ketones and aldehydes, such as ketose and aldose sugars. During the process, oligomers of the quaternary ammonium may first be produced and then reacted with a crosslinker.

RAFT processes typically used a chain transfer agent, usually a thiocarbonylthio compound like dithioesters, thiocarbamates, and xanthates, to allow control over the molecular weight and polydispersity during a free radical polymerization. The process may result in low molecular weight distribution, and a pre-chosen molecular weight when applied in linear polymerization. When applied in cross-linked systems, the process may result in high surface area, porous materials, including porous materials with high specific surface area and, or narrow pore size distribution, analogous to SFRP. ATRP processes typically use a transition metal as the catalyst and an alkyl halide initiator. The dormant species becomes activated by the transition metal complex to generate radicals via an electron transfer process, while the transition metal is oxidized to a higher oxidation state. The number of initiators determines the number of polymer chains. It typically results in polymers with similar molecular weights and narrow molecular distribution when used in linear polymerizations. When applied in crosslinked systems, the process may result in high surface area, porous materials, including porous materials with high specific surface area and, or narrow pore size distribution, analogous to SFRP. Nitroxide mediated radical polymerization (also known as stable free-radical polymerization) uses a nitroxide initiator to generate polymers and typically results in well-controlled stereochemistry and a very low dispersity.

When RAFT or ATRP are used, chemical groups may remain in the polymer derived from: thiocarbonylthio compounds, xanthates, trithiocarbonates, dithioesters, dithiocarbamates, dithiobenzoates, metal catalysts used in ATRP, copper, or iron. These materials may be remnant in the polymer through covalent or physical mechanisms, and either as whole molecules or fragments derived from them.

The embodiments may include a system for capture of $CO_2$ from ambient air containing the aerogel sorbent. The adsorption may occur in ambient conditions, and with active water removal. Desorption may occur through the addition of water vapor, fog, mist or addition of liquid water. Desorption in the system may occur in multiple chambers in series.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the embodiments.

What is claimed is:

1. A composition of matter, comprising:
a porous cross-linked polymer network;
quaternary ammonium ions in the cross-linked polymer network with at least 80 percent of the quaternary ammonium ions are linked directly to at least one other quaternary ammonium ion; and
at least one counter ion in the cross-linked polymer network that is at least one of hydroxide or a counter ion capable of forming hydroxide upon reaction with water.

2. The composition of matter of claim 1, wherein the at least one counter ion in the cross-linked polymer network capable of forming hydroxide is one of bicarbonate, carbonate, phosphate, hydrogen phosphate, or dihydrogen phosphate.

3. The composition of matter of claim 1, wherein the porous cross-linked polymer network includes residual chemical moieties from controlled radical polymerization.

4. The composition of matter of claim 3, wherein the residual chemical moieties from controlled radical polymerization are formed from at least one of nitroxides, chain transfer agents, thiols, TEMPO-OH, nitroxide species derived from the decomposition of an alkoxyamine, 4-hydroxy-TEMPO, TEMPO derivatives, TIPNO, TIPNO derivatives, chlorobenzyl-TIPNO, SG1, thiocarbonylthio compounds, xanthates, trithiocarbonates, dithioesters, dithiocarbamates, dithiobenzoates, metal catalysts used in ATRP, copper, and iron.

5. The composition of matter of claim 1, wherein the porous cross-linked polymer network includes a residue of at least one additional monomer.

6. The composition of matter of claim 5, wherein the residue of at least one additional monomer is formed from at least one of styrene, styrenic compounds, n-vinyl pyrrolidone, vinyl acetate, vinyl chloride, methacrylates, acrylates, methyl methacrylate, acrylonitrile, methyl acrylate, ethylene, propylene, dimethylsiloxane, fluorinated vinyl, acrylic, or methacrylic compounds, hexa-iso-fluoroisopropyl methacrylate, hexa-iso-fluoroisopropyl acrylate, 2,2,2-trifluoroethyl methacrylate, 2,2,2-trifluoroethyl acrylate, and 1H,1H,2H,2H-Heptadecafluorodecyl methacrylate.

7. The composition of matter as claimed in claim 5, wherein the residue of the at least one additional monomer comprises a hydrophobic monomer that contains at least one of fluorinated or aliphatic groups.

8. The composition of matter as claimed in claim 1, wherein the quaternary ammonium ions comprise moieties that result from polymerization of diallyldimethylammonium, trimethylammonium ion, 2-(Methacryloyloxy)ethyl] trimethylammonium, 2-(Acryloyloxy)ethyl]trimethylammonium, 3-(Methacryloylamino)propyl]trimethylammonium, (3-Acrylamidopropyl)trimethylammonium, or trimethyl-ammonium functional monomers.

9. The composition of matter as claimed in claim 1, wherein the composition of matter includes a cross-linker.

10. The composition of matter as claimed in claim 9, wherein the cross-linker is one selected from the group consisting of: divinylbenzene, 1,6-hexanediol diacrylate, groups including methyl, ethyl propyl, isopropyl, tri, tetra, penta or hexa-acrylates and methacrylates, trimethylolpropane triacrylate, trimethylolpropane ethoxylate triacrylate, di(trimethylolpropane) tetraacrylate, dipentaerythritol penta-/hexa-acrylate, trimethacryl adamantane, dipentaerithritol, trimethylolpropane trimethacrylate, phenylene dimethacrylate, phenylene diacrylate, and perfluorohexanediol diacrylate.

11. The composition of matter as claimed in claim 9, wherein the cross-linker is hydrophobic and contains at least one of fluorinated or aliphatic groups.

12. The composition of matter as claimed in claim 1, wherein the cross-linked polymer network comprises an aerogel.

13. The composition of matter as claimed in claim 12, wherein the aerogel may comprise one of a powder, a structured monolith, a self-supporting structure or a separate structural material.

14. The composition of matter as claimed in claim 1, wherein the composition of matter has a surface area that is greater than 200 $m^2/g$.

15. The composition of matter as claimed in claim 1, wherein the composition of matter has an average pore diameter between 2 and 50 nm.

16. The composition of matter as claimed in claim 1, wherein the mass fraction of the quaternary ammonium groups in the composition of matter has a range between 5% and 90%.

17. The composition of matter as claimed in claim 1, wherein the quaternary ammonium ions in the cross-linked polymer network are derived from monomers that have molecular weight below 200 g/mol, when the monomers are in a chloride ion-exchanged form.

18. The composition of matter as claimed in claim 1, wherein the composition of matter has a surface area that is greater than 500 $m^2/g$.

19. The composition of matter as claimed in claim 1, wherein the mass fraction of the quaternary ammonium groups in the composition of matter has a range between 50% and 90%.

* * * * *